United States Patent
Song et al.

(10) Patent No.: US 9,756,095 B2
(45) Date of Patent: Sep. 5, 2017

(54) MOBILE DEVICE FOR PERFORMING MONITORING ON COOPERATIVE SITUATION, METHOD OF PERFORMING MONITORING ON COOPERATIVE SITUATION USING SAID MOBILE DEVICE, AND SYSTEM FOR PERFORMING MONITORING ON COOPERATIVE SITUATION INCLUDING SAID MOBILE DEVICE

(71) Applicant: Korea Advanced Institute of Science and Technology, Daejeon (KR)

(72) Inventors: Junehwa Song, Daejeon (KR); Youngki Lee, Daejeon (KR); Younghyun Ju, Daejeon (KR); Chulhong Min, Daejeon (KR); Inseok Hwang, Daejeon (KR); Jihyun Yu, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 166 days.

(21) Appl. No.: 14/430,431

(22) PCT Filed: May 16, 2013

(86) PCT No.: PCT/KR2013/004335
§ 371 (c)(1),
(2) Date: Mar. 23, 2015

(87) PCT Pub. No.: WO2014/046369
PCT Pub. Date: Mar. 27, 2014

(65) Prior Publication Data
US 2015/0229680 A1    Aug. 13, 2015

(30) Foreign Application Priority Data
Sep. 24, 2012 (KR) .................. 10-2012-0105835

(51) Int. Cl.
*H04W 4/00* (2009.01)
*H04L 29/06* (2006.01)
*H04W 24/02* (2009.01)

(52) U.S. Cl.
CPC .......... *H04L 65/403* (2013.01); *H04W 4/008* (2013.01); *H04W 24/02* (2013.01)

(58) Field of Classification Search
CPC ...... H04L 65/403; H04W 4/008; H04W 24/02
See application file for complete search history.

(56) References Cited

U.S. PATENT DOCUMENTS

2008/0248789 A1* 10/2008 Song ................. H04W 52/0267
                                                    455/414.3
2010/0105409 A1* 4/2010 Agarwal ............... G01S 5/0263
                                                    455/456.1

(Continued)

FOREIGN PATENT DOCUMENTS

KR    20110138547 A    12/2011
KR    20120082202 A    7/2012

OTHER PUBLICATIONS

Youngki Lee et al., "CoMon: Cooperative Ambience Monitoring Platform with Continuity and Benefit Awareness", MobiSys, pp. 1-15, Jun. 25, 2012.

(Continued)

*Primary Examiner* — Brian J Gillis
*Assistant Examiner* — Amy Ling
(74) *Attorney, Agent, or Firm* — Harness, Dickey & Pierce, P.L.C.

(57) ABSTRACT

A mobile apparatus includes a cooperator detector, a cooperation planner and a context processor. The cooperator detector selects a cooperating mobile apparatus among adjacent mobile apparatuses. The cooperation planner determines a cooperation plan for operating cooperative context monitoring with the cooperating mobile apparatus. The (Continued)

context processor operates the context monitoring based on the cooperation plan. Accordingly, the resource may be efficiently used and the range of the context monitoring may be enlarged.

34 Claims, 12 Drawing Sheets

(56) References Cited

U.S. PATENT DOCUMENTS

| | | | |
|---|---|---|---|
| 2011/0177802 A1* | 7/2011 | Gupta | H04L 12/66 455/418 |
| 2011/0231767 A1* | 9/2011 | Russell | G06F 17/3087 715/733 |
| 2011/0310751 A1* | 12/2011 | Song | H04W 84/18 370/252 |
| 2012/0185910 A1* | 7/2012 | Miettinen | G06F 21/31 726/1 |

OTHER PUBLICATIONS

International Search Report PCT/ISA/210 for International Application No. PCT/KR2013/004335 Dated Aug. 7, 2013.
Written Opinion of the International Searching Authority PCT/ISA/237 for International Application No. PCT/KR2013/004335 Dated Aug. 7, 2013.

* cited by examiner

|  | UA | UB | UC |
|---|---|---|---|
| QUERIES | LOCATION, DUST, AMBIENT SOUND | AMBIENT SOUND, DUST | LOCATION, AMBIENT SOUND |
| DEVICES | SMARTPHONE, DUST SENSOR | SMARTPHONE, DUST SENSOR | SMARTPHONE |

FIG. 9d

| ID | COOPERATION CASE | | UA'S SAVING(mW) | | | UB'S SAVING(mW) | | |
|---|---|---|---|---|---|---|---|---|
| | DESCRIPTION | | TOTAL | PHONE | DUST | TOTAL | PHONE | DUST |
| 1 | CASE_CO(AMBIENT) | | 30 | 30 | 0 | 12 | 12 | 0 |
| 2 | CASE_CO(DUST) | | 336 | -25 | 361 | 337 | -24 | 361 |
| 3 | CASE_EX(UA:DUST,UB:AMBIENT) | | 131 | 131 | 0 | 122 | -5 | 127 |
| 4 | CASE_EX(UA:AMBIENT,UB:DUST) | | 704 | -17 | 721 | 225 | 225 | 0 |
| 5 | CASE_EX(UA:AMBIENT,UB:LOCATION) | | 231 | 231 | 0 | -191 | -191 | 0 |
| 6 | CASE_EX(UA:DUST,UB:LOCATION) | | 454 | 454 | 0 | 451 | -270 | 721 |

MOBILE DEVICE FOR PERFORMING MONITORING ON COOPERATIVE SITUATION, METHOD OF PERFORMING MONITORING ON COOPERATIVE SITUATION USING SAID MOBILE DEVICE, AND SYSTEM FOR PERFORMING MONITORING ON COOPERATIVE SITUATION INCLUDING SAID MOBILE DEVICE

CROSS-REFERENCE TO RELATED APPLICATIONS

This application is the National Phase under 35 U.S.C. §371 of PCT International Application No PCT/KR2013/004335, filed on May 16, 2013, which claims priority to Korean Application No. KR 10-2012-0105835 filed Sep. 24, 2012; the entire contents of each of which are hereby incorporated by reference.

THE ART TO WHICH THE INVENTION

Example embodiments of the present invention relate to a mobile apparatus. More particularly, example embodiments of the present invention relate to a mobile apparatus operating cooperative context monitoring with an adjacent mobile apparatus, a method of cooperative context monitoring using the mobile apparatus and a cooperative context monitoring system including the mobile apparatus.

BACKGROUND OF THE INVENTION

Recent paradigm of information communication technology may be a ubiquitous computing, a ubiquitous network, a pervasive computing and so on. "Ubiquitous" means that a user may easily get any desired information anytime and anywhere. In an upcoming ubiquitous age, smart objects, having computing and communication function, may recognize a dynamic environment and be adaptive to the dynamic environment. In other words, the smart objects may have a context awareness feature.

A personal area network (PAN) is one of the core technologies realizing the ubiquitous network having the context awareness feature. The PAN is a network which is provided to a person to communicate in a close range. The person using the PAN may be connected with various devices in about 10 m with respect to the person.

The PAN is suitable for a context-aware application, which provides proper services in response to an action of the user, a status of the user and an environment around the user. In the PAN environment, the network is operated around the person so that a portable mobile apparatus, capable of receiving data from various sensors and outputting context information to the context aware applications, may be a core platform. For example, a mobile terminal may recognize a context of the user by collecting and analyzing the sensed data, and may provide recognized context information to the context aware application. The context aware application may provide proper services to the user according to the context of the user. Accordingly, the mobile apparatus capable of supporting a number of the context aware applications may be necessary.

The portable mobile apparatus supporting the context aware application may have poor computing resources in the computing platform in the PAN environment. Thus, the mobile apparatus alone may not consistently operate the context aware application for a long time. In addition, a monitoring range of the single mobile apparatus is limited so that the single mobile apparatus may not run various applications simultaneously.

CONTENT OF THE INVENTION

Technical Object of the Invention

To solve the above mentioned problems, example embodiments of the present invention provide a mobile apparatus operating cooperative context monitoring capable of efficiently using resources and enlarging a range of monitoring.

Example embodiments of the present invention also provide a method of cooperative context monitoring using the mobile apparatus.

Example embodiments also provide a cooperative context monitoring system including the mobile apparatus.

Contruction and Operation of the Invention

In an example mobile apparatus according to the present invention, the mobile apparatus includes a cooperator detector, a cooperation planner and a context processor. The cooperator detector selects a cooperating mobile apparatus among adjacent mobile apparatuses. The cooperation planner determines a cooperation plan for operating cooperative context monitoring with the cooperating mobile apparatus. The context processor operates the context monitoring based on the cooperation plan.

In an example embodiment, the cooperator detector may detect the adjacent mobile apparatus which is able to continuously cooperate with.

In an example embodiment, the cooperator detector may periodically scan the adjacent mobile apparatus. A scanning interval of the mobile apparatus may be determined based on an average power consumption for scanning and a cooperation period loss. The cooperation period loss may be generated by not operating cooperation due to the scanning.

In an example embodiment, the cooperator detector may determine whether the adjacent mobile apparatus is an acquaintance or not.

In an example embodiment, the cooperator detector may determine whether the adjacent mobile apparatus is the acquaintance using a database storing a Media Access Control ("MAC") address of the acquaintance.

In an example embodiment, the database may further include a type of the acquaintance and a type of activity with the acquaintance.

In an example embodiment, the cooperator detector may determine a number of meeting with the adjacent mobile apparatus is greater than a threshold value when the adjacent mobile apparatus is not the acquaintance.

In an example embodiment, the cooperator detector may check connection status by trying to reconnect to the mobile apparatus which is the acquaintance and the mobile apparatus which has the number of meeting greater than the threshold value after a threshold interval.

In an example embodiment, the cooperator detector may select the cooperating mobile apparatus by determining an expected cooperation duration for the mobile apparatus which is the acquaintance and the mobile apparatus which has the number of meeting greater than the threshold value.

In an example embodiment, the cooperation planner may generate all possible cooperation cases with the cooperating mobile apparatus, determine expected benefits of the cooperation cases, and select the cooperation case based on the expected benefits.

In an example embodiment, the cooperation planner may alternately select the cooperation case with the cooperating mobile apparatus.

In an example embodiment, the cooperating case may include a role sharing cooperation case generated by the mobile apparatus and the cooperating mobile apparatus independently operating context monitoring and sharing the result of context monitoring.

In an example embodiment, when a set of the role sharing cooperation case is EX, the role sharing cooperation case is case_ex, the context provided to the cooperating mobile apparatus is ctxout and the context provided from the cooperating mobile apparatus is ctxin, the context being able to be provided by the mobile apparatus is S1, the context needed by the mobile apparatus is D1, the context being able to be provided by the cooperating mobile apparatus is S2 and the context needed by the cooperating mobile apparatus is D2, EX={case_ex(ctxout,ctxin)|ctxout∈(S1∩D2), ctxin∈(D1∩S2), ctxout≠ctxin}.

In an example embodiment, the cooperating case may include a time sharing cooperation case generated by the mobile apparatus and the cooperating mobile apparatus alternately operating the same context monitoring by dividing monitoring time.

In an example embodiment, when a set of the time sharing cooperation case is CM, the time sharing cooperation case is case_co, the context being able to be provided by the mobile apparatus is S1, the context needed by the mobile apparatus is D1, the context being able to be provided by the cooperating mobile apparatus is S2 and the context needed by the cooperating mobile apparatus is D2, CM={case_co(ctxco)|ctxco∈(S1∩D1∩S2∩D2)}.

In an example embodiment, the cooperation planner may omit the cooperation case having the expected benefit of the mobile apparatus less than zero among the cooperating cases.

In an example embodiment, the cooperation planner may determine the expected benefit using a function representing energy demand to operate the context monitoring.

In an example embodiment, the cooperation planner may determine the expected benefit using a cooperation policy of the mobile apparatus.

In an example embodiment, the cooperation policy may be to minimize energy consumption of the mobile apparatus.

In an example embodiment, the cooperation policy may be to minimize a weighted sum of energy consumption of all devices of a user having the mobile apparatus.

In an example embodiment, the mobile apparatus may further include an application interface receiving a context monitoring query from an application, transmitting the context monitoring query to the cooperation planner, receiving a result of the context monitoring query and transmitting the result of the context monitoring query to the application.

In an example embodiment, the mobile apparatus may further include a device manager receiving a sensed data from a sensor, transmitting the sensed data to the context processor, receiving a resource status of the sensor and transmitting a resource availability to the cooperation planner.

In an example embodiment, the mobile apparatus may further include an internal sensor transmitting an internal sensed data to the context processor.

In an example embodiment, the mobile apparatus may further include an access controller transmitting an access rule to the cooperation planner to selectively disconnect the adjacent mobile apparatus according to the access rule.

In an example method of cooperative context monitoring according to the present invention, the method includes selecting a cooperating mobile apparatus among adjacent mobile apparatuses, determining a cooperation plan for operating the cooperative context monitoring with the cooperating mobile apparatus and operating the context monitoring based on the cooperation plan.

In an example embodiment, the selecting the cooperating mobile apparatus may include detecting the adjacent mobile apparatus which is able to continuously cooperate with.

In an example embodiment, the selecting the cooperating mobile apparatus may further include determining whether the adjacent mobile apparatus is an acquaintance or not.

In an example embodiment, the selecting the cooperating mobile apparatus may further include determining a number of meeting with the adjacent mobile apparatus is greater than a threshold value when the adjacent mobile apparatus is not the acquaintance.

In an example embodiment, the selecting the cooperating mobile apparatus may further include checking connection status by trying to reconnect to the mobile apparatus which is the acquaintance and the mobile apparatus which has the number of meeting greater than the threshold value after a threshold interval.

In an example embodiment, the selecting the cooperating mobile apparatus may further include determining an expected cooperation duration for the mobile apparatus which is the acquaintance and the mobile apparatus which has the number of meeting greater than the threshold value.

In an example embodiment, the determining the cooperation plan may include generating all possible cooperation cases with the cooperating mobile apparatus, determining expected benefits of the cooperation cases and selecting the cooperation case based on the expected benefits.

In an example embodiment, the cooperation case may be alternately selected by the mobile apparatus and the cooperating mobile apparatus.

In an example embodiment, the cooperating case may include a role sharing cooperation case generated by the mobile apparatus and the cooperating mobile apparatus independently operating context monitoring and sharing the result of context monitoring.

In an example embodiment, the cooperating case may include a time sharing cooperation case generated by the mobile apparatus and the cooperating mobile apparatus alternately operating the same context monitoring by dividing monitoring time.

In an example embodiment, to determine the expected benefits of the cooperation cases, the cooperation case having the expected benefit of the at least one of the mobile apparatus and the cooperating mobile apparatus less than zero may be omitted among the cooperating cases.

In an example embodiment, to determine the expected benefits of the cooperation cases, a function representing energy demand to operate the context monitoring may be used.

In an example embodiment, to determine the expected benefits of the cooperation cases, a cooperation policy of the mobile apparatus may be used.

In an example cooperative monitoring system according to the present invention includes a first mobile apparatus, a second mobile apparatus and a sensor. The first mobile apparatus includes a cooperator detector selecting a cooperating mobile apparatus among adjacent mobile apparatuses, a cooperation planner determining a cooperation plan for operating cooperative context monitoring with the cooperating mobile apparatus and a context processor operating the context monitoring based on the cooperation plan. The second mobile apparatus operates cooperative context monitoring with the first mobile apparatus when being adjacent to the first mobile apparatus. The sensor provides a sensed data to the first mobile apparatus when being adjacent to the first mobile apparatus.

In an example embodiment, the sensor may include a context processor sensing a context and generating the sensed data and a resource monitor determining a resource status of the sensor and providing the resource status to the first mobile apparatus.

In an example embodiment, the sensor may be a wearable sensor which is able to be attached to a body of a user of the first mobile apparatus.

Advantage of the Invention

According to the mobile apparatus, the method of cooperative context monitoring and the cooperative context monitoring system, the mobile apparatus selects a cooperating mobile apparatus among adjacent mobile apparatuses and determines a cooperation plan with the cooperating mobile apparatus. Thus, the mobile apparatus may efficiently use the resources and enlarge a range of the context monitoring.

BRIEF EXPLANATION OF THE DRAWINGS

FIG. 9a is a conceptual diagram illustrating an example of apparatuses of users UA, UB and UC and cooperative monitoring queries.

FIG. 9b is a conceptual diagram illustrating cooperative context monitoring steps among the users UA, UB and UC of FIG. 9a.

FIG. 9d is a conceptual diagram illustrating cooperation cases and expected benefits between the users UA and UB of FIG. 9a during PHASE 2 of FIG. 9b.

DETAILED DESCRIPTION OF THE INVENTION

Figure 1:
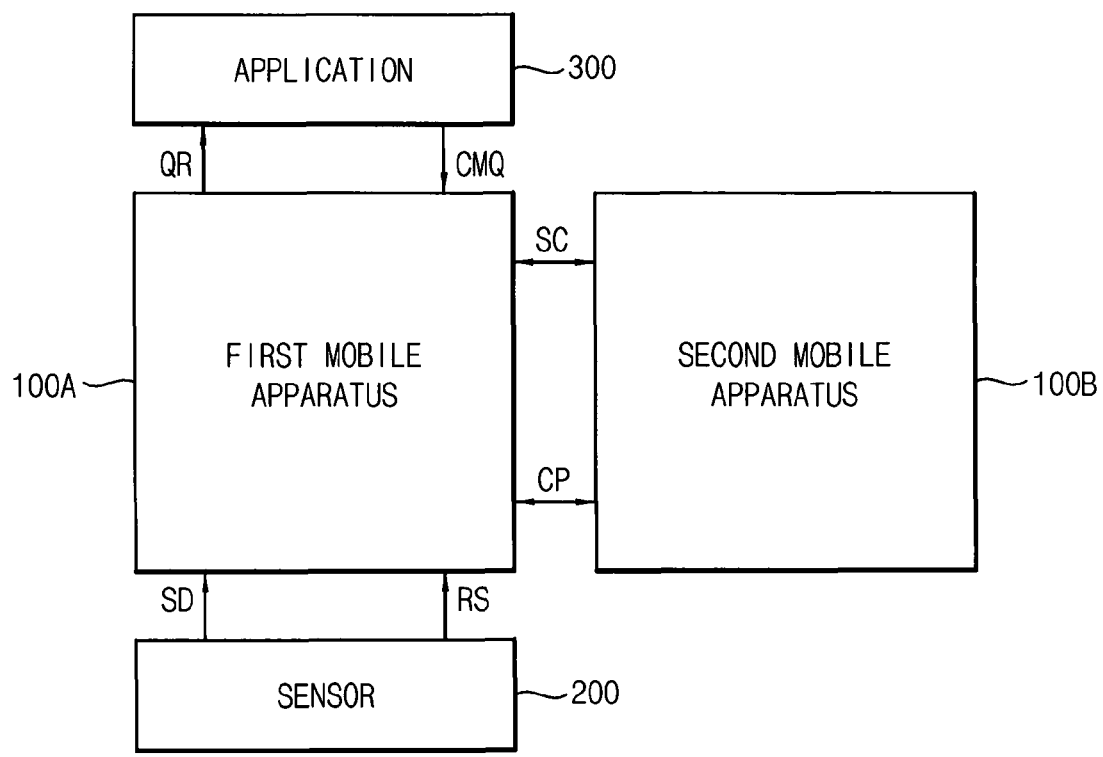
FIG. 1 is a block diagram illustrating a cooperative context monitoring system according to an example embodiment of the present invention.

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings. For the same elements in figures, the same reference may be used and any duplicative explanation will be omitted.

FIG. 1 is a block diagram illustrating a cooperative context monitoring system according to an example embodiment of the present invention.

Referring to FIG. 1, the context monitoring system includes a first mobile apparatus 100A, a second mobile apparatus 100B, a sensor 200 and an application 300.

The first mobile apparatus 100A receives a context monitoring query ("CMQ") from the application 300 which operates a context monitoring function. The first mobile apparatus 100A receives a sensed data SD from the sensor 200. The first mobile apparatus 100A determines whether that the CMQ is true or not. The first mobile apparatus 100A outputs the result of the query QR to the application 300. The first mobile apparatus 100A may receive a resource status RS of the sensor 200 from the sensor 200.

The first mobile apparatus 100A operates the context monitoring cooperatively with the adjacent mobile apparatus 100B. The first mobile apparatus 100A may detect the adjacent mobile apparatus which is able to continuously cooperate with to find a cooperating mobile apparatus. The first mobile apparatus 100A may periodically scan the adjacent mobile apparatus and receive a scanning result SC to find the cooperating mobile apparatus. Similarly, the second mobile apparatus 100B may also periodically scan the adjacent mobile apparatus and receive a scanning result SC to find the cooperating mobile apparatus. When the first mobile apparatus 100A and the second mobile apparatus 100B are mutually cooperative, the first mobile apparatus 100A and the second mobile apparatus 100B determine a cooperation plan CP.

For example, the first mobile apparatus 100A may be one of a smart phone, a tablet PC and a PDA. However, the present invention is not limited to the kinds of the first mobile apparatus 100A.

The sensor 200 provides the sensed data SD to the first mobile apparatus 100A. Alternatively, the sensor 200 may provide a feature which is extracted from the sensed data SD to the first mobile apparatus 100A. In addition, the sensor 200 may transmit the resource status RS of the sensor to the first mobile apparatus 100A. The sensor 200 may be turned on or off according to instruction of the first mobile apparatus 100A.

For example, the sensor 200 may be a plurality of sensors 200. The sensor 200 may be a light sensor, a temperature sensor, a position sensor, a dust sensor, an ultra violet ray sensor, a thermometer, a hygrometer, a carbon dioxide sensor, an ambient sound sensor, an accelerometer and so on. Accordingly, the sensor 200 may detect light, temperature, position, quantity of dust, intensity of ultra violet ray, temperature, humidity, quantity of carbon dioxide, ambient sound and acceleration, and so on. The sensor 200 may be a wearable sensor attached to a human body.

The sensed data SD from the sensor 200 is provided to the first mobile apparatus 100A, and is used to determine whether the sensed data SD satisfies a context required from the application 300.

The application 300 requests the CMQ according to an object of program to the first mobile apparatus 100A. The first mobile apparatus 100A registers the CMQ, and monitors whether the result of the CMQ changes to TRUE or FALSE. When the result of the CMQ changes, the first mobile apparatus 100A may provide the result of query QR to the application 300. The CMQ may include the context, accuracy of context awareness and duration of monitoring the context.

The second mobile apparatus 100B may be the cooperating mobile apparatus which is adjacent to the first mobile apparatus 100A. The second mobile apparatus 100B may be owned by a user different from an owner of the first mobile apparatus 100A. The second mobile apparatus 100B is detected by the first mobile apparatus 100A by scanning of the first mobile apparatus 100A. When the second mobile apparatus 100B is determined to the cooperating mobile apparatus of the first mobile apparatus 100A, the second mobile apparatus 100B may determine the cooperation plan with the first mobile apparatus 100A.

For example, the second mobile apparatus 100B may be one of a smart phone, a tablet PC and a PDA. However, the present invention is not limited to the kinds of the second mobile apparatus 100B.

Although not shown in figures, the cooperative context monitoring system may further include an application and sensor for the second mobile apparatus 100B.

Figure 2:
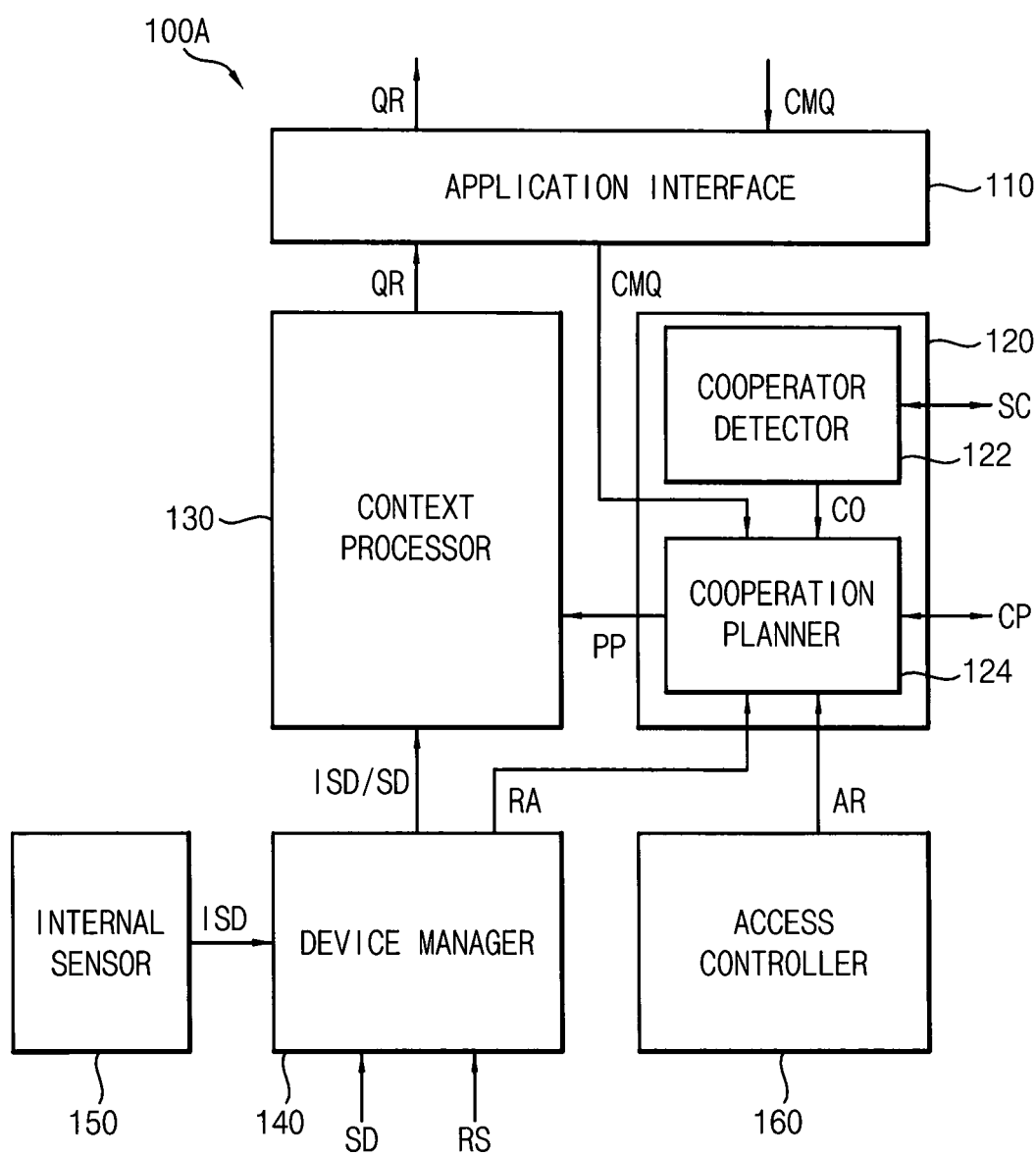
FIG. 2 is a block diagram illustrating a first mobile apparatus of FIG. 1.

FIG. 2 is a block diagram illustrating the first mobile apparatus 100A of FIG. 1.

Referring to FIGS. 1 and 2, the first mobile apparatus 100A includes an application interface 110, a cooperative context monitoring middleware 120, a context processor 130 and a device manager 140. The first mobile apparatus 100A may further include an internal sensor 150. The first mobile apparatus 100A may further include an access controller 160.

The application interface 110 communicates with the application 300. The application interface 110 receives the CMQ from the application 300 and transmits the CMQ to a cooperation planner 124 of the cooperative context monitoring middleware 120. The application interface 110 transmits the result of query QR of the context processor 130 to the application 300.

The cooperative context monitoring middleware 120 includes a cooperator detector 122 and a cooperation planner 124.

The cooperator detector 122 selects the cooperating mobile apparatus CO (e.g. the second mobile apparatus 100B) among the adjacent mobile apparatuses. The cooperator detector 122 may detect the mobile apparatus which is able to continuously cooperate with. The cooperator detector 122 may periodically scan the mobile apparatus which is adjacent to the first mobile apparatus 100A and receive a scanning result SC. The cooperator detector 122 finds the cooperating mobile apparatus CO and transmits information of the cooperating mobile apparatus CO to the cooperation planner 124. The operation of the cooperator detector 122 is explained in detail referring to FIGS. 4 to 6 and 9a to 9d.

The cooperation planner 124 determines the cooperation plan CP for the cooperative context monitoring with the cooperating mobile apparatus CO which is selected by the cooperator detector 122. The cooperation planner 124 receives the CMQ from the application interface 110, receives the information of the cooperating mobile apparatus CO from the cooperator detector 122 and resource availability RA from the device manager 140. The cooperation planner 124 may further receive an access rule AR from the access controller. The cooperation planner 124 determines the cooperation plan CP with the cooperating mobile apparatus CO. The cooperation planner 124 outputs a processing plan PP to the context processor 130 based on the cooperation plan CP. The operation of the cooperation planner 124 is explained in detail referring to FIGS. 7, 8*a* to 8*d* and 9*a* to 9*d*.

The context processor 130 operates context monitoring based on the cooperation plan CP. The context processor 130 receives the processing plan PP generated based on the cooperation plan CP from the cooperation planner 124. The context processor 130 receives the sensed data SD of the sensor 200 via the device manager 140. The context processor 130 extracts the features from the sensed data SD and an internal sensed data ISD which are corresponding to the CMQ and classifies the extracted features and outputs the result of the query QR to the application interface 110.

For example, the context processor 130 may include a frequency domain feature extractor ("FFT") extracting the features from the sensed data SD and the internal sensed data ISD.

For example, the context processor 130 may include a Gaussian mixture model ("GMM") classifier classifying the extracted features.

The device manager 140 receives the sensed data SD from the sensor 200 and transmits the sensed data SD to the context processor 130. In addition, the device manager 140 receives the resource status RS of the sensor 200 and transmits the resource availability RA to the cooperation planner 124.

The internal sensor 150 transmits the internal sensing data ISD to the context processor 130. For example, the internal sensor 150 may be a global positioning system ("GPS") determining the position of the first mobile apparatus 100A. The internal sensor 150 may be a microphone detecting an ambient sound. In an example embodiment, alternatively, the first mobile apparatus 100A may not include the internal sensor 150.

The access controller 160 may transmit the access rule AR to the cooperation planner 124. The cooperation planner 124 may selectively disconnect adjacent mobile apparatuses according to the access rule AR. For example, the access rule AR may be set by a user. For example, the access rule AR may include a Media Access Control ("MAC") address of the mobile apparatus to block the access. The access controller may protect privacy of the user of the first mobile apparatus. In an example embodiment, alternatively, the first mobile apparatus may not include the access controller 160.

Although not shown in figures, the second mobile apparatus 100B may have a structure substantially the same as the structure of the first mobile apparatus 100A. For example, the second mobile apparatus 100B may include the application interface 110, the cooperative context monitoring middleware 120, the context processor 130 and the device manager 140.

Figure 3:
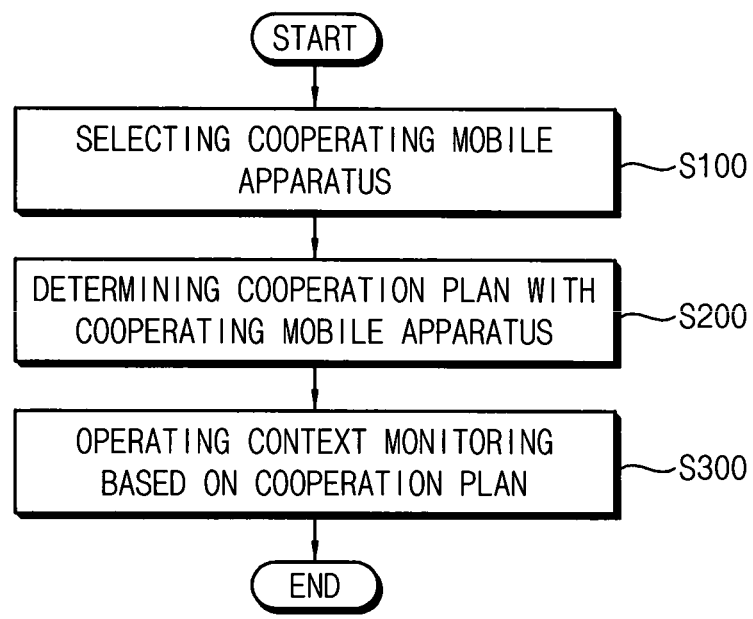
FIG. 3 is a flowchart illustrating a method of cooperative context monitoring using the first mobile apparatus of FIG. 1.

FIG. 3 is a flowchart illustrating a method of cooperative context monitoring using the first mobile apparatus 100A of FIG. 1.

Referring to FIGS. 1 to 3, the method of cooperative context monitoring includes selecting the cooperating mobile apparatus CO among adjacent mobile apparatuses (step S100), determining the cooperation plan CP for cooperative context monitoring with the cooperating mobile apparatus CO (step S200) and operating context monitoring based on the cooperation plan CP (step S300). As explained above, the cooperator detector 122 selects the cooperating mobile apparatus CO. The context processor 130 operates the context monitoring.

Figure 4:
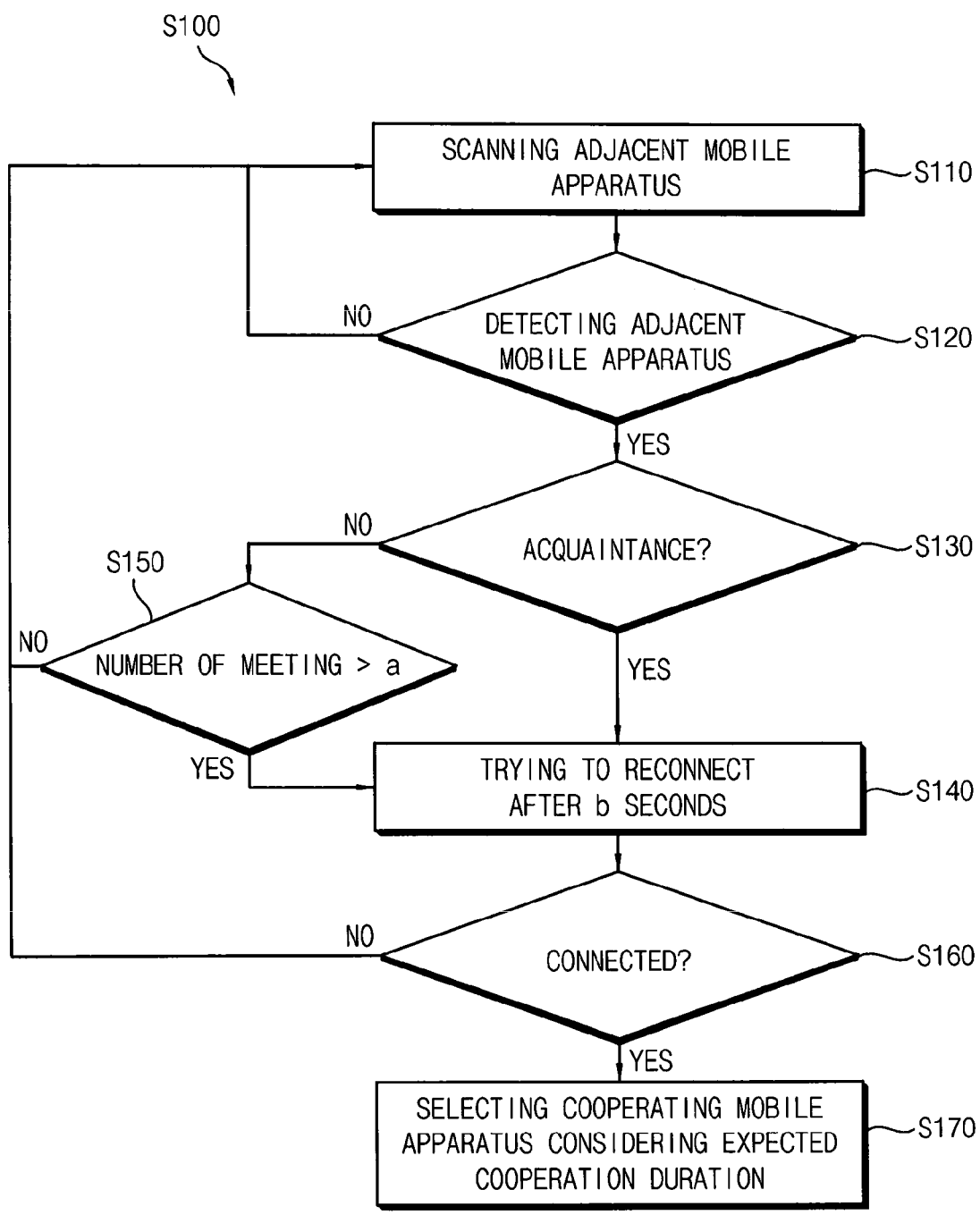
FIG. 4 is a flowchart illustrating a step of selecting a cooperating mobile apparatus of FIG. 3.
Figure 5:
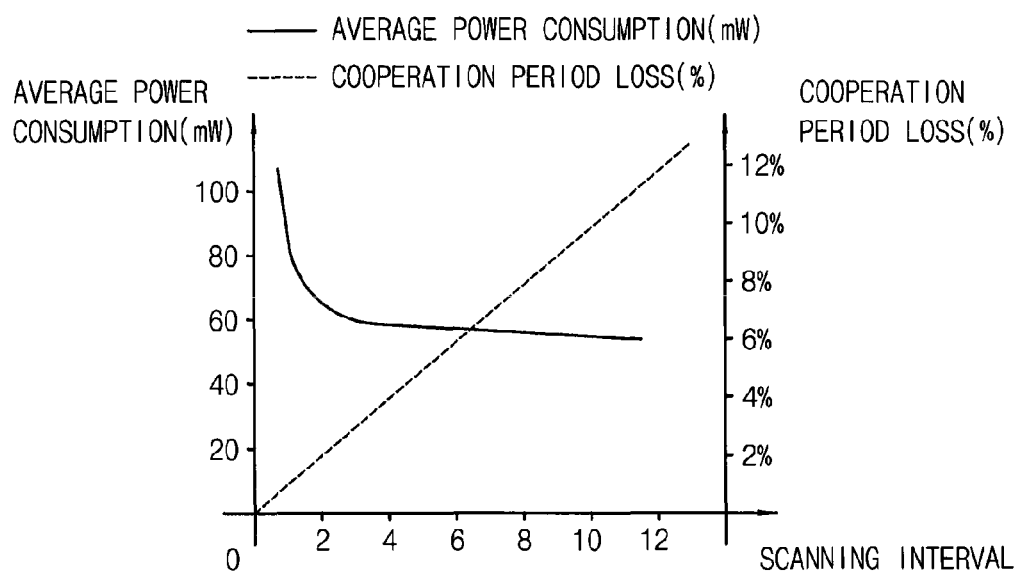
FIG. 5 is a graph illustrating an average power consumption and a cooperation period loss according to a scanning interval of a cooperative detector of FIG. 2.
Figure 6:
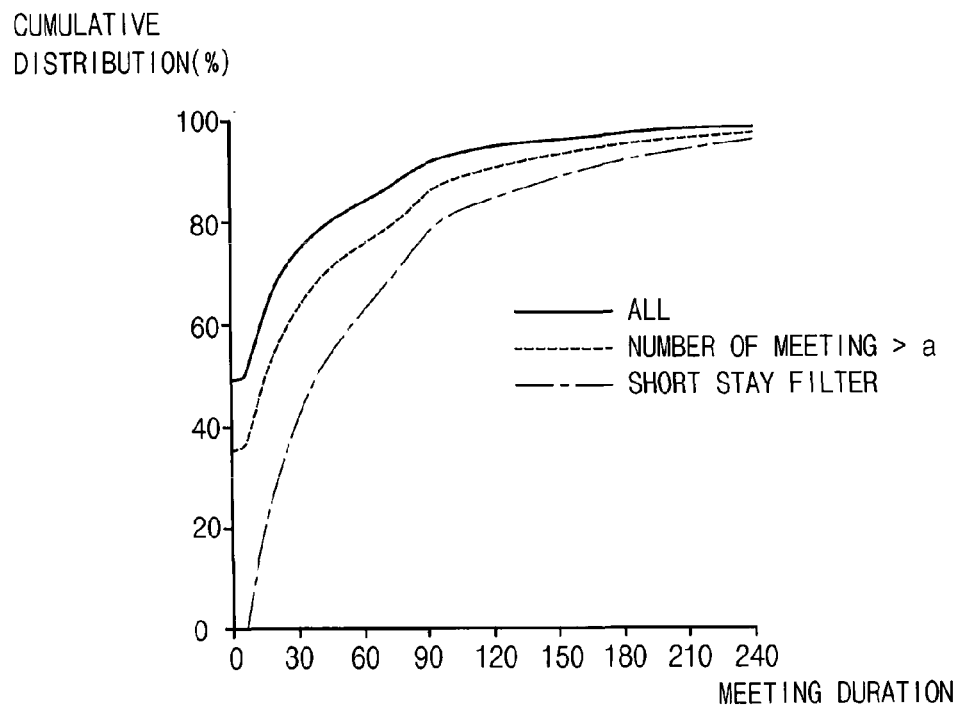
FIG. 6 is a graph illustrating an expected cooperation duration according to a meeting duration between the first mobile apparatus of FIG. 1 and the adjacent mobile apparatus.

FIG. 4 is a flowchart illustrating a step of selecting the cooperating mobile apparatus CO of FIG. 3. FIG. 5 is a graph illustrating an average power consumption and a cooperation period loss according to a scanning interval of the cooperator detector 122 of FIG. 2. FIG. 6 is a graph illustrating an expected cooperation duration according to a meeting duration between the first mobile apparatus 100A of FIG. 1 and the adjacent mobile apparatus.

Referring to FIGS. 1 to 6, the cooperator detector 122 scans the adjacent mobile apparatus (step S110). The cooperator detector 122 may periodically scan the adjacent mobile apparatus.

For example, the cooperator detector 122 may use one of ZigBee scanning, Bluetooth scanning and WiFi-Adhoc scanning. The cooperator detector 122 may use the Bluetooth scanning which is most general. When the cooperator detector 122 uses the Bluetooth scanning, the cooperator detector 122 may detect the adjacent mobile apparatuses in a range of about ten meters.

Referring to FIG. 5, the scanning interval of the cooperator detector 122 is explained. The cooperator detector 122 consumes the power to operate periodic scanning. As the scanning interval gets shorter, the power consumption increases. As the scanning interval gets longer, the power consumption decreases. In FIG. 5, the example average power consumption is represented using a unit of mW.

When the first mobile apparatus 100A cooperates with the cooperating mobile apparatus CO, the power consumption of the first mobile apparatus 100A may be reduced. During a detecting time of the cooperator detector 122 to detect the cooperating mobile apparatus, the first mobile apparatus 100A cannot cooperate with the cooperating mobile apparatus so that energy loss may be generated. When the scanning interval increases, the cooperation period loss linearly increases. In FIG. 5, the example cooperation period loss is represented using a unit of %.

The scanning interval of the cooperator detector 122 to scan the adjacent mobile apparatuses may be determined based on the average power consumption and the cooperation period loss. Considering that the cooperation period loss is linear, the scanning interval may be set to a point when the average power consumption starts to be saturated. For example, the scanning interval may be about five minutes.

The cooperator detector 122 determines whether the adjacent mobile apparatus is detected by the scanning or not (step S120).

When the adjacent mobile apparatus is not detected, the cooperator detector 122 continuously scans the adjacent mobile apparatus in the scanning interval.

When the adjacent mobile apparatus is detected, the cooperator detector 122 determines whether the detected mobile apparatus is an acquaintance of the first mobile apparatus 100A or not. The cooperator detector 122 may determine whether the detected mobile apparatus is an acquaintance of the first mobile apparatus 100A or not using a database storing the MAC addresses of the acquaintances.

The database storing the MAC address may further store a type of the acquaintance and a type of activity which is operated by the first mobile apparatus 100A with the acquaintance. The cooperator detector 122 may determine an expected cooperation duration of the first mobile apparatus 100A and the acquaintance using the type of the acquaintance and the type of the activity of the first mobile apparatus 100A with the acquaintance.

For example, the type of the acquaintance may include a family, a friend, a work-related person, and so on. The expected cooperation duration of the work-related person may be the longest, the expected cooperation duration of the friend is longer than the expected cooperation duration of the family and the expected cooperation duration of the family may be the shortest. For example, the type of the activity may include socializing, eating, exercise and work. The expected cooperation duration of the work may be the longest, the expected cooperation duration of the exercise is longer than the socializing and the eating and the expected cooperation duration of the socializing is longer than the eating and the expected cooperation duration of the eating may be the shortest.

The MAC address of the acquaintance, the type of the acquaintance and the type of the activity with the acquaintance may be inputted by a user. Alternatively, the MAC address of the acquaintance, the type of the acquaintance and the type of the activity with the acquaintance may be automatically generated using an address list or a contact list of the first mobile apparatus 100A.

If the detected mobile apparatus is the acquaintance, a reconnection step (step S140) is operated.

If the detected mobile apparatus is not the acquaintance, the cooperator detector 122 determines the number of meeting with the detected mobile apparatus is greater than a threshold value a in a predetermined duration (step S150). The cooperator detector 122 determines the familiar stranger which is defined as not acquaintance but frequently met. For example, the cooperator detector 122 may determine whether the number of meeting with the detected mobile apparatus is greater than ten times in two weeks. The mobile apparatus having the number of meeting greater than the threshold value a has a relatively high expected cooperation duration with the first mobile apparatus 100A.

The mobile apparatus having the number of meeting equal to or less than the threshold value a may be not expected to have sufficient cooperation duration with the first mobile apparatus 100A. Thus, the detected mobile apparatus having the number of meeting equal to or less than the threshold value a may not determined as the cooperating mobile apparatus. Then the cooperator detector 122 may keep scanning periodically.

If the detected mobile apparatus having the number of meeting greater than the threshold value a, the reconnection step (step S140) is operated.

The cooperator detector 122 tries to reconnect to the mobile apparatus which is the acquaintance and the mobile apparatus which has the number of meeting greater than the threshold value a after a threshold interval b (step S140).

The cooperator detector 122 determines whether the detected mobile apparatus is still able to connect with the first mobile apparatus 100A after the threshold interval b (step S150). This step may be called to short stay filtering.

If the detected mobile apparatus which is the acquaintance or has the number of meeting greater than the threshold value a is not able to connect with the first mobile apparatus 100A after the threshold interval b, the detected mobile apparatus just pass by the first mobile apparatus 100A so that the detected mobile apparatus may not be the cooperating mobile device. Thus, the cooperator detector 122 may keep scanning periodically.

If the detected mobile apparatus which is the acquaintance or has the number of meeting greater than the threshold value a is able to connect with the first mobile apparatus 100A after the threshold interval b, the detected mobile apparatus may be the cooperating mobile apparatus.

In FIG. 6, the mobile apparatus having the meeting duration over 30 minutes is just about 26% without considering the number of meeting. The mobile apparatus which has the number of meeting greater than the threshold value a having the meeting duration over 30 minutes is about 38%. In an example embodiment, the threshold value a may be ten times in two weeks. In addition, the mobile apparatus which has the number of meeting greater than the threshold value a and passing the short stay filter having the meeting duration over 30 minutes is about 58%. In an example embodiment, the threshold interval b for the short stay filtering may be 300 seconds. As explained above, the high cooperation duration may be expected by considering the number of meeting and the short stay filtering.

The cooperator detector 122 determines the cooperating mobile apparatus CO by considering the expected cooperation duration of the adjacent mobile apparatus (step S170).

For example, when the plurality of the cooperating mobile apparatuses is detected, the cooperator detector 122 may sort the cooperating mobile apparatuses in descending order of the expected cooperation duration. For example, when both of the mobile apparatus which is the acquaintance and the mobile apparatus which has the number of meeting greater than the threshold value a are detected, the cooperator detector 122 may give a priority to the mobile apparatus which is the acquaintance. For example, when both of the mobile apparatus which is the family's and the mobile apparatus which is the friend's are detected, the cooperator detector 122 may give a priority to the friend's mobile apparatus.

Alternatively, the cooperator detector 122 may select only one cooperating mobile apparatus CO among candidates of the cooperating mobile apparatus.

Figure 7:
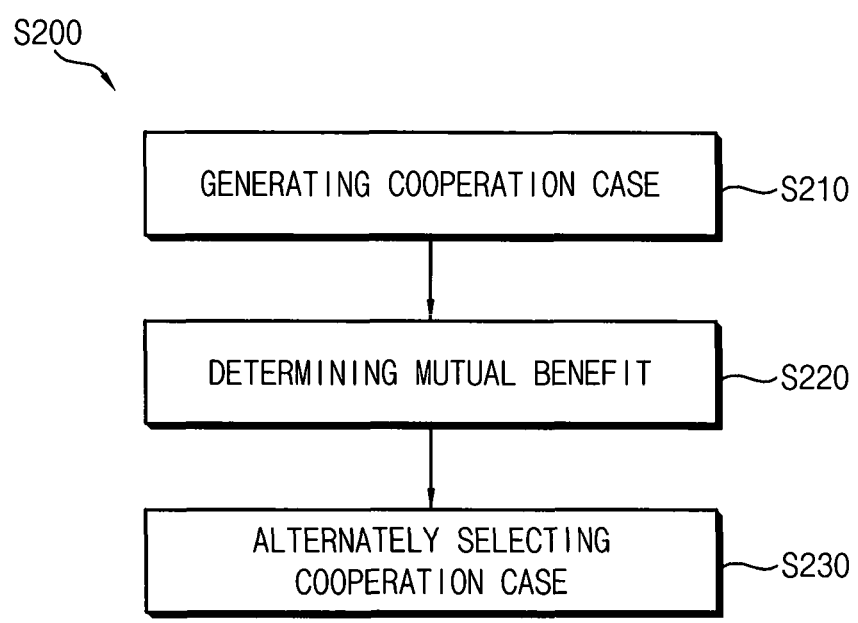
FIG. 7 is a flowchart illustrating a step of determining a cooperation plan of FIG. 3.
Figure 8A:
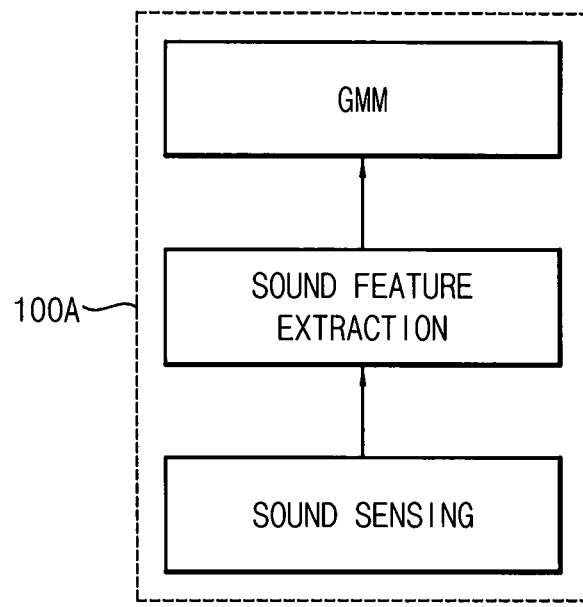
FIG. 8a is a conceptual diagram illustrating an example of a first local processing plan of the first mobile apparatus of FIG. 1.
Figure 8B:
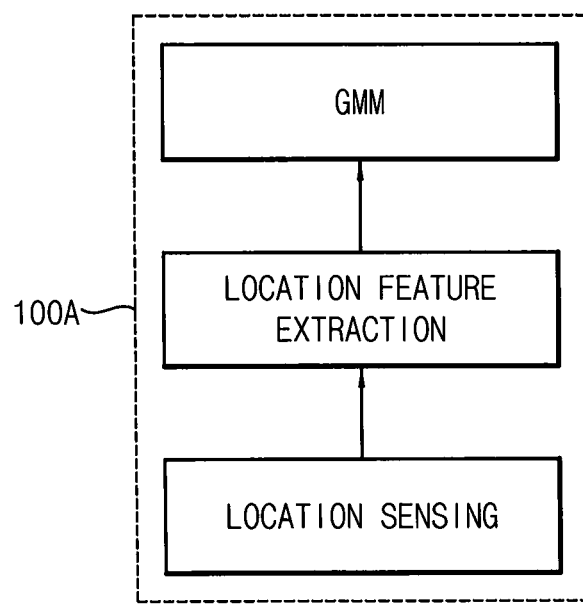
FIG. 8b is a conceptual diagram illustrating an example of a second local processing plan of the first mobile apparatus of FIG. 1.
Figure 8C:
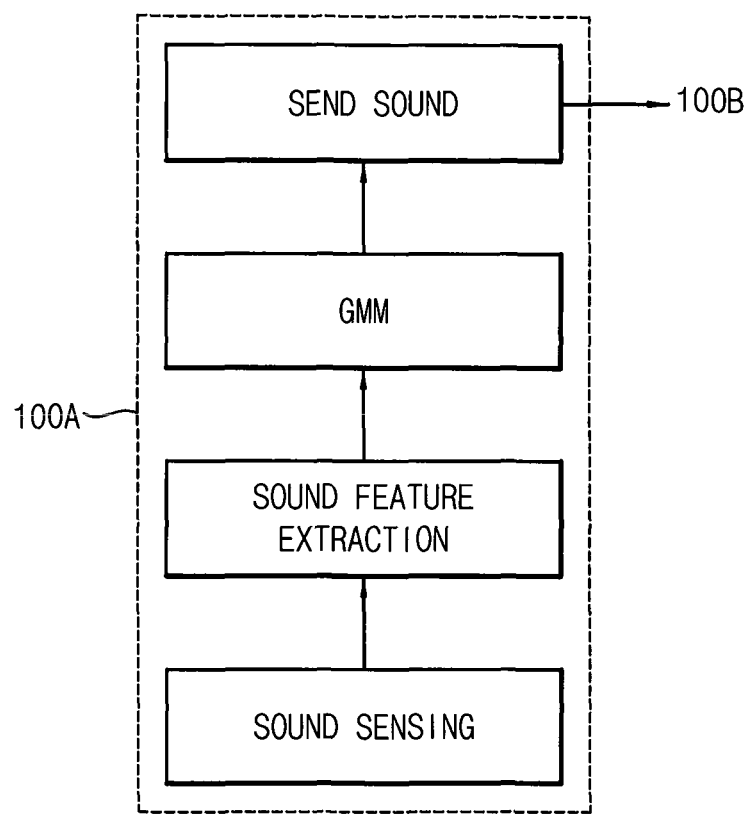
FIG. 8c is a conceptual diagram illustrating an example of a first cooperation plan of the first mobile apparatus of FIG. 1.
Figure 8D:
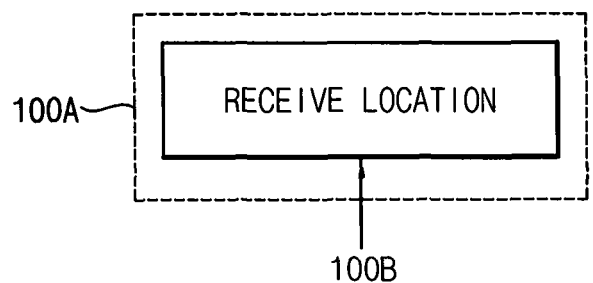
FIG. 8d is a conceptual diagram illustrating an example of a second cooperation plan of the first mobile apparatus of FIG. 1.

FIG. 7 is a flowchart illustrating a step S200 of determining the cooperation plan CP of FIG. 3. FIG. 8a is a conceptual diagram illustrating an example of a first local processing plan of the first mobile apparatus 100A of FIG. 1. FIG. 8b is a conceptual diagram illustrating an example of a second local processing plan of the first mobile apparatus 100A of FIG. 1. FIG. 8c is a conceptual diagram illustrating an example of a first cooperation plan of the first mobile apparatus 100A of FIG. 1. FIG. 8d is a conceptual diagram illustrating an example of a second cooperation plan of the first mobile apparatus 100A of FIG. 1.

Referring to FIGS. 1 to 7 and 8a to 8d, the cooperation planner 124 generates all possible cooperation cases with the cooperating mobile apparatus CO (step S210).

When the mobile apparatus in the cooperative context monitoring system is U, the context required to the mobile apparatus U is D, the context able to be provided by the mobile apparatus U is S and a cooperation policy of the mobile apparatus is P, the mobile apparatus U may be represented parameters of U=<D, S, P>.

The cooperation cases may include a role sharing cooperation case generated by the first mobile apparatus 100A and the cooperating mobile apparatus CO independently operating context monitoring and sharing the result of context monitoring.

When a set of the role sharing cooperation case is EX, the role sharing cooperation case is case_ex, the context provided to the cooperating mobile apparatus is ctxout and the context provided from the cooperating mobile apparatus is ctxin, $EX=\{case\_ex(ctxout,ctxin)|ctxout \in (S1 \cap D2), ctxin \in (D1 \cap S2), ctxout \neq ctxin\}$.

The context ctxout which a mobile apparatus U1 provides to a mobile apparatus U2 which is the cooperating mobile apparatus of the mobile apparatus U1 should be the context S1 being able to be provided from the mobile apparatus U1 and the context D2 needed by the mobile apparatus U2.

The context ctxin which is received from the mobile apparatus U2 should be the context D1 needed by the first mobile apparatus U1 and the context S2 being able to be provided from the mobile apparatus U2.

In addition, to be the role sharing cooperation case case_ex, the context ctxout which the mobile apparatus U1 provides to the mobile apparatus U2 should be different from the context ctxin which is provided from the mobile apparatus U2 to the mobile apparatus U1.

The cooperation case may include a time sharing cooperation case generated by the first mobile apparatus 100A and the cooperating mobile apparatus CO alternately operating the same context monitoring by dividing the monitoring time.

When a set of the time sharing cooperation case is CM, the time sharing cooperation case is case_co and the context monitored by the mobile apparatuses U1 and U2 is ctxco, CM={case_co(ctxco)|ctxco∈(S1∩D1∩S2∩D2)}.

The context ctxco which is monitored by the mobile apparatuses U1 and U2 should be the context S1 being able to be provided from the mobile apparatus U1, and the context D1 needed by the mobile apparatus U1 and the context S2 being able to be provided from the mobile apparatus U2 and the context D2 needed by the mobile apparatus U2.

The cooperation planner 124 determines the expected benefits of all the cooperation cases (step S220). The cooperation planner 124 may omit the cooperation case having the expected benefit of the first mobile apparatus 100A less than zero among the cooperating cases. The cooperation planner 124 may omit the cooperation case which is disadvantageous to the first mobile apparatus 100A.

Alternatively, the cooperation planner 124 may omit the cooperation case having the expected benefit of the first mobile apparatus 100A equal to or less than zero among the cooperation cases. The cooperation planner 124 may omit the cooperation case which is not advantageous to the first mobile apparatus 100A.

As explained above, the first mobile apparatus 100A selects the cooperation case which is not disadvantageous or which is advantageous to the first mobile apparatus 100A so that the advantage of the cooperative monitoring may be guaranteed. In the same way, the cooperating mobile apparatus CO selects the cooperation case which is not disadvantageous or which is advantageous to the cooperating mobile apparatus CO so that the mutual advantage may be guaranteed.

The cooperation planner 124 may determine the expected benefit according to the cooperation policy of the first mobile apparatus 100A. For example, the cooperation policy may be minimizing energy consumption of the first mobile apparatus 100A. For example, the cooperation policy may be minimizing a weighted sum of energy consumption of all devices (e.g. the first mobile apparatus 100A and a plurality of sensors 200) of the user having the first mobile apparatus 100A. For example, the cooperation policy may be maximizing the number of the possible CMQs in a viewpoint of increasing support of the application. For example, the cooperation policy may be increasing the operation time of the applications 300 over a set time, when the user of the first mobile apparatus 100A may charge the devices after the set time.

For example, the cooperation planner 124 may determine the expected benefit using a function, getEDVector, representing energy demand to operate the context monitoring. For example, when getEDVector({Dust}) is called, energy demands of the devices (e.g. smartphone and dust sensor) to monitor the quantity of the dust are returned.

In addition, the cooperation planner 124 may determine the expected benefit using a function, getEAVector, representing remaining energy of all devices of the user having the first mobile apparatus 100A.

In FIGS. 8a and 8b, the first mobile apparatus 100A operates a first local processing plan and a second local processing plan without cooperation.

According to the first local processing plan, the first mobile apparatus 100A senses the sound by itself, the first mobile apparatus 100A extracts the sound feature from the sensed sound data and the first mobile apparatus 100A classifies the sound feature.

According to the second local processing plan, the first mobile apparatus 100A sensed the position by itself, the first mobile apparatus 100A extracts the position feature from the sensed position data and the first mobile apparatus 100A classifies the position feature.

Although not shown in figures, the second mobile apparatus 100B also monitors the sound context and the position context by itself according to the first local processing plan and the second local processing plan.

In FIGS. 8c and 8d, the first mobile apparatus 100A operates a first cooperation plan and a second cooperation plan by a role sharing with the second mobile apparatus 100B.

In the present example embodiment, the first and second mobile apparatuses 100A and 100B cooperatively monitor the sound context and the position context. The first mobile apparatus 100A monitors the sound context. The second mobile apparatus 100B monitors the position context.

According to the first cooperation plan, the first mobile apparatus 100A senses the sound, extracts the sound feature from the sensed sound data and classifies the sound feature. In addition, the first mobile apparatus 100A transmits the sound context to the second mobile apparatus 100B.

According to the second cooperation plan, the first mobile apparatus 100A receives the position context from the second mobile apparatus 100B.

According to the first and second cooperation plans, the energy consumption of the first and second mobile apparatuses 100A and 100B is reduced to monitor the sound context and the position contest. In addition, the CPU usage, the frequency bandwidth and the memory usage of the first and second mobile apparatuses 100A and 100B may be reduced.

The first and second mobile apparatuses 100A and 100B may select the cooperation plan which is advantageous to themselves by their own policies so that the mutual advantage of the first and second mobile apparatuses 100A and 100B may be guaranteed.

If there are plural cooperation cases which are able to cooperate with each other and mutually advantageous to the first and second mobile apparatuses 100A and 100B, the first mobile apparatus 100A and the second mobile apparatus 100B may alternately select the cooperation cases. The first mobile apparatus 100A and the second mobile apparatus 100B may alternately select the cooperation cases until the cooperation cases which are able to cooperate with each other and mutually advantageous to the first and second mobile apparatuses 100A and 100B do not exist anymore. Thus, the first mobile apparatus 100A and the second mobile apparatus 100B may share the benefits.

Although the first mobile apparatus 100A and the second mobile apparatus 100B forms a pair to determine the cooperation plan in the present example embodiment, the present invention is not limited thereto. Three or more mobile apparatuses may form a group to determine the cooperation plan.

Figures 9A, 9B:
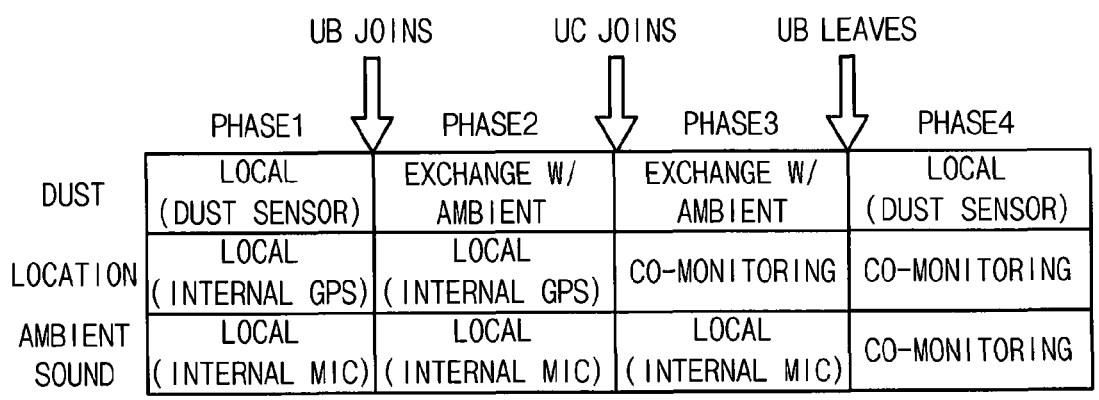
Figure 9C:
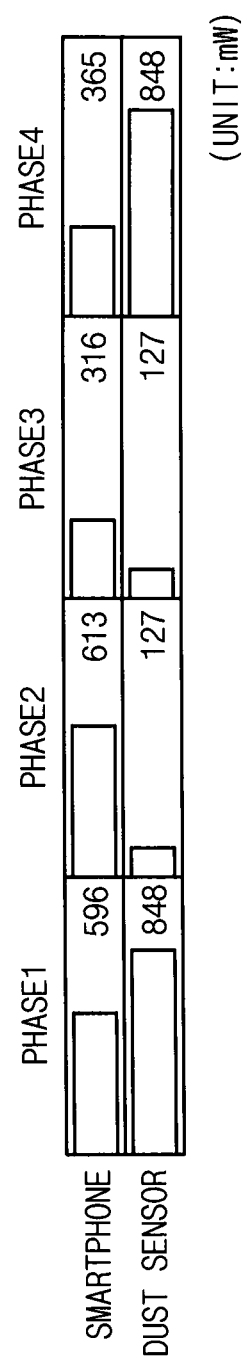
FIG. 9c is a conceptual diagram illustrating energy consumptions of the apparatuses of the user UA of FIG. 9a during the cooperative context monitoring steps.

FIG. 9a is a conceptual diagram illustrating an example of apparatuses of users UA, UB and UC and cooperative monitoring queries. FIG. 9b is a conceptual diagram illustrating cooperative context monitoring steps among the users UA, UB and UC of FIG. 9a. FIG. 9c is a conceptual diagram illustrating energy consumptions of the apparatuses of the user UA of FIG. 9a during the cooperative context monitoring steps. FIG. 9d is a conceptual diagram illustrating cooperation cases and expected benefits between the users UA and UB of FIG. 9a during PHASE 2 of FIG. 9b.

Hereinafter, the cooperative context monitoring of the present example embodiment is explained in detail referring to FIGS. 9a to 9d.

Referring to FIGS. 1 to 7 and 9a to 9d, the user UA, UB and UC exist in the cooperative context monitoring system. The user UA has a smartphone and a dust sensor. The user UB has a smartphone and a dust sensor. The user UC has a smartphone.

The smartphone of the user UA is operating the application having CMQs for a position, a quantity of dust and an ambient sound. The smartphone of the user UB is operating the application having CMQs for an ambient sound, a quantity of dust. The smartphone of the user UC is operating the CMQs for a position and an ambient sound.

During a first phase PHASE1, the user UB and the user UC are not adjacent to the user UA. Thus, the smartphone of the user UA does not detect the adjacent smartphone.

During the first phase PHASE1, the quantity of dust is monitored by the dust sensor of the user UA in a local mode, the position is monitored by an internal GPS of the smartphone of the user UA in a local mode and the ambient sound is monitored by an internal microphone of the smartphone of the user UA in a local mode.

During a second phase PHASE2, the user UB is adjacent to the user UA. Thus, the smartphone of the user UA detects the smartphone of the user UB. In the present example embodiment, the smartphone of the user UB is the acquaintance of the smartphone of the user UA or the smartphone of the user UB has the number of meeting greater than the threshold value a with the smartphone of the user UA. In addition, the smartphone of the user UB is connected with the smartphone of the user UA after the threshold interval b. Therefore, the smartphone of the user UB is determined to the cooperating mobile apparatus CO of the smartphone of the user UA.

During the second phase PHASE2, the quantity of dust is received from the user UB by the role sharing with the user UB. The position is monitored by the internal GPS of the smartphone of the user UA in the local mode. The ambient sound is monitored by the internal microphone of the smartphone of the user UA and provided to the user UB by the role sharing with the user UB.

During a third phase PHASE3, the user UC is adjacent to the user UA. In addition, the user UB is still adjacent to the user UA. Thus, the smartphone of the user UA detects the smartphone of the user UB and the smartphone of the user UC. In the present example embodiment, the smartphone of the user UC is the acquaintance of the smartphone of the user UA or the smartphone of the user UC has the number of meeting greater than the threshold value a with the smartphone of the user UA. In addition, the smartphone of the user UC is connected with the smartphone of the user UA after the threshold interval b. Therefore, the smartphone of the user UB and the smartphone of the user UC are determined to the cooperating mobile apparatus CO of the smartphone of the user UA.

During the third phase PHASE3, the quantity of dust is received from the user UB by the role sharing with the user UB like the second phase PHASE2. The position is co-monitored by the user UA and the user UC by the time sharing with the user UC. The ambient sound is monitored by the internal microphone of the smartphone of the user UA and provided to the user UB by the role sharing with the user UB.

During a fourth phase PHASE4, the user UC is still adjacent to the user UA. However, the user UB is not adjacent to the user UA. Thus, the smartphone of the user UA detects the smartphone of the user UC. Therefore, the smartphone of the user UC is determined to the cooperating mobile apparatus CO of the smartphone of the user UA.

During the fourth phase PHASE4, the quantity of dust is monitored by the dust sensor of the user UA in a local mode. The position is co-monitored by the user UA and the user UC by the time sharing with the user UC. The ambient sound is also co-monitored by the user UA and the user UC by the time sharing with the user UC.

In FIG. 9c, during the first phase PHASE1 when the smartphone of the user UA operates in the local mode, the smartphone of the user UA consumes 596 mW and the dust sensor of the user UA consumes 848 mW.

During the second phase PHASE2 when the smartphone of the user UA operates cooperative context monitoring with the smartphone of the user UB, the smartphone of the user UA consumes 613 mW and the dust sensor of the user UA consumes 127 mW.

During the third phase PHASE3 when the smartphone of the user UA operates cooperative context monitoring with the smartphone of the user UB and the smartphone of the user UC, the smartphone of the user UA consumes 316 mW and the dust sensor of the user UA consumes 127 mW.

During the fourth phase PHASE4 when the smartphone of the user UA operates cooperative context monitoring with the smartphone of the user UC, the smartphone of the user UA consumes 365 mW and the dust sensor of the user UA consumes 848 mW.

In the present example embodiment, the user UA has the cooperation policy to minimize the sum of the energy consumption of the smartphone and the dust sensor. Thus, during the second to fourth phases PHASE2 to PHASE4 when the user UA cooperates with the users UB and UC, the sum of the energy consumption of the smartphone and the dust sensor of the user UA is less than the sum of the energy consumption of the smartphone and the dust sensor of the user UA in the local mode.

If the user UA has the cooperation policy to minimize the energy consumption of the smartphone UA, the cooperation plan of the second phase PHASE2 is not advantageous to the user UA so that the cooperation plan of the second phase PHASE2 should be changed.

FIG. 9d is a conceptual diagram illustrating all of the cooperation cases between the user UA and the user UB during the second phase PHASE2.

In a first cooperation case, the user UA and the user UB monitor the ambient sound by the time sharing. In a second cooperation case, the user UA and the user UB monitor the quantity of dust by the time sharing. In a third cooperation case, the user UA monitors the quantity of dust and the user UB monitors the ambient sound. In a fourth cooperation case, the user UA monitors the ambient sound and the user UB monitors the quantity of dust. In a fifth cooperation case, the user UA monitors the ambient sound and the user UB monitors the position. In a sixth cooperation case, the user UA monitors the quantity of dust and the user UB monitors the position.

The first cooperation case gives benefit of 30 mW to the smartphone of the user UA and does not give benefit or loss to the dust sensor of the user UA. The first cooperation case gives benefit of 12 mW to the smartphone of the user UB and does not give benefit or loss to the dust sensor of the user UB.

The second cooperation case gives loss of 25 mW to the smartphone of the user UA and gives benefit of 361 mW to the dust sensor of the user UA. The second cooperation case gives benefit of 336 mW to the total of the smartphone and dust sensor of the user UA. The second cooperation case gives loss of 24 mW to the smartphone of the user UB and gives benefit of 361 mW to the dust sensor of the user UB. The second cooperation case gives benefit of 337 mW to the total of the smartphone and dust sensor of the user UB.

The third cooperation case gives benefit of 131 mW to the smartphone of the user UA and does not give benefit or loss to the dust sensor of the user UA. The third cooperation case gives loss of 5 mW to the smartphone of the user UB and gives benefit of 127 mW to the dust sensor of the user UB. The third cooperation case gives benefit of 122 mW to the total of the smartphone and dust sensor of the user UB.

The fourth cooperation case gives loss of 17 mW to the smartphone of the user UA and gives benefit of 721 mW to the dust sensor of the user UA. The fourth cooperation case gives benefit of 704 mW to the total of the smartphone and dust sensor of the user UA. The fourth cooperation case gives benefit of 25 mW to the smartphone of the user UB and does not give benefit or loss to the dust sensor of the user UB.

The fifth cooperation case gives benefit of 231 mW to the smartphone of the user UA and does not give benefit or loss to the dust sensor of the user UA. The fifth cooperation case gives loss of 191 mW to the smartphone of the user UB and does not give benefit or loss to the dust sensor of the user UB.

The sixth cooperation case gives benefit of 454 mW to the smartphone of the user UA and does not give benefit or loss to the dust sensor of the user UA. The sixth cooperation case gives loss of 270 mW to the smartphone of the user UB and gives benefit of 721 mW to the dust sensor of the user UB. The sixth cooperation case gives benefit of 451 mW to the total of the smartphone and dust sensor of the user UB.

In the present example embodiment, the user UA has the cooperation policy to minimize the sum of the energy consumption of the smartphone and the dust sensor. The user UB has the cooperation policy to minimize the energy consumption of the smartphone.

Thus, the second, third, fifth and sixth cooperation cases are not advantageous to the user UB so that the second, third, fifth and sixth cooperation cases are omitted.

The most advantageous cooperation case to the user UA is the fourth cooperation case which has the minimum sum of the energy consumption of the smartphone and the dust sensor. The most advantageous cooperation case to the user UB is the fourth cooperation case which has the minimum energy consumption of the smartphone.

Thus, in the second phase PHASE2, the users UA and UB select the fourth cooperation case regardless of a priority to select the cooperation case.

Alternatively, if the users UA and UB have the cooperation policy to minimize the sum of the energy consumption of the smartphone and the dust sensor, the fifth cooperation case is not advantageous to the user UB so that the fifth cooperation case is omitted.

The most advantageous cooperation case to the user UA is the fourth cooperation case which has the minimum sum of the energy consumption of the smartphone and the dust sensor. The most advantageous cooperation case to the user UB is the sixth cooperation case which has the minimum sum of the energy consumption of the smartphone and the dust sensor.

Thus, if the user UA has a priority to select the cooperation case, in the second phase PHASE2, the user UA selects the fourth cooperation case. If the user UB has a priority to select the cooperation case, in the second phase PHASE2, the user UB selects the sixth cooperation case. If the user UA has a priority to select the cooperation case, the user UB has a next priority to select the cooperation case. If the user UB has a priority to select the cooperation case, the user UB has a next priority to select the cooperation case.

Figure 10:
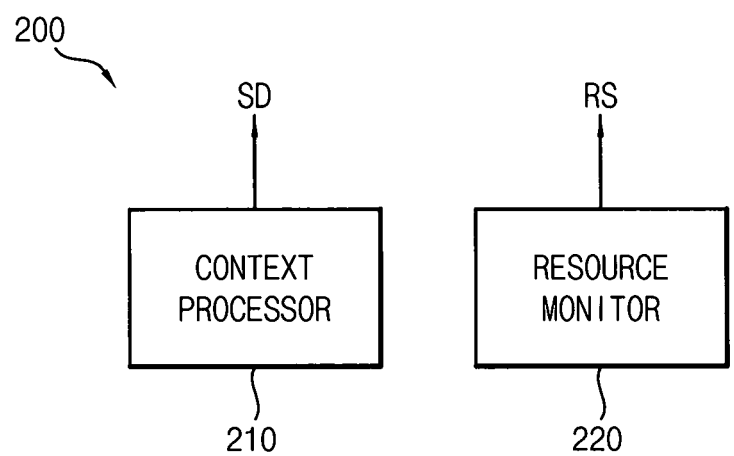
FIG. 10 is a block diagram illustrating a sensor of FIG. 1.

FIG. 10 is a block diagram illustrating the sensor 200 of FIG. 1.

The sensor 200 includes a context processor 210 and a resource monitor 220.

The context processor 210 senses the context and generates the sensed data SD. The context processor 210 transmits the sensed data SD to the device manager 140 of the first mobile apparatus 100A. Alternatively, the context processor 210 may extract the feature from the sensed data SD and transmits the feature to the device manager 140 of the first mobile apparatus 100A.

The resource monitor 220 determines the resource status RS of the sensor 200 and transmits the resource status RS of the sensor 200 to the device manager 140 of the first mobile apparatus 100A.

INDUSTRIAL AVAILABILITY

According to the present invention, the adjacent mobile apparatuses operate cooperative context monitoring so that the limited resources may be efficiently used. In addition, the range of context monitoring may be enlarged.

Although the example embodiments of the present invention have been described, it is understood that the present invention should not be limited to these example embodiments but various changes and modifications can be made by one ordinary skilled in the art within the concept and scope of the present invention as hereinafter claimed.

EXPLANATION ON REFERENCE NUMERALS

| | |
|---|---|
| 100A: first mobile apparatus | 100B: second mobile apparatus |
| 110: application interface | 120: cooperative context monitoring middleware |
| 122: cooperator detector | 124: cooperation planner |
| 130: context processor | 140: device manager |
| 150: internal sensor | 160: access controller |
| 200: sensor | 210: context processor |
| 220: resource monitor | 300: application |

The invention claimed is:

1. A mobile apparatus comprising:
a cooperator detector configured to select a cooperating mobile apparatus among adjacent mobile apparatuses;
a cooperation planner configured to determine a cooperation plan for operating cooperative context monitoring with the cooperating mobile apparatus; and a context processor configured to operate a context monitoring based on the cooperation plan,
wherein the cooperation planner is configured to operate all possible cooperation cases with the cooperating mobile apparatus, determine expected benefits of the cooperation cases, and select at least one of the cooperation cases based on the expected benefits,
wherein the cooperation cases include a role sharing cooperation case generated by the mobile apparatus and the cooperating mobile apparatus configured to independently operate context monitoring and share results of the context monitoring, and
wherein when a set of the role sharing cooperation case is EX, the role sharing cooperation case is case ex, a context provided to the cooperating mobile apparatus is ctxout and a context provided from the cooperating mobile apparatus is ctxin, a context being able to be provided by the mobile apparatus is S1, a context needed by the mobile apparatus is D1, a context being able to be provided by the cooperating mobile apparatus is S2 and a context needed by the cooperating mobile apparatus is D2, EX=(case_ex(ctxout,ctxin) κctxout∈(S1∩D2), cttcin∈(D1∩S2), ctxout≠ctxin).

2. The mobile apparatus of claim 1, wherein the cooperator detector is configured to detect the adjacent mobile apparatus which is able to continuously cooperate with.

3. The mobile apparatus of claim 2, wherein the cooperator detector is configured to periodically scan the adjacent mobile apparatus,
a scanning interval of the mobile apparatus is determined based on an average power consumption for scanning and a cooperation period loss, the cooperation period loss being generated by not operating cooperation due to the scanning.

4. The mobile apparatus of claim 2, wherein the cooperator detector is configured to determine whether the adjacent mobile apparatus is an acquaintance or not.

5. The mobile apparatus of claim 4, wherein the cooperator detector is configured to determine whether the adjacent mobile apparatus is the acquaintance using a database storing a Media Access Control ("MAC") address of the acquaintance.

6. The mobile apparatus of claim 5, wherein the database further includes a type of the acquaintance and a type of activity with the acquaintance.

7. The mobile apparatus of claim 4, wherein the cooperator detector is configured to determine a number of meeting with the adjacent mobile apparatus is greater than a threshold value when the adjacent mobile apparatus is not the acquaintance.

8. The mobile apparatus of claim 7, wherein the cooperator detector is configured to check connection status by trying to reconnect to the mobile apparatus which is the acquaintance and the mobile apparatus which has the number of meeting greater than the threshold value after a threshold interval.

9. The mobile apparatus of claim 7, wherein the cooperator detector is configured to select the cooperating mobile apparatus by determining an expected cooperation duration for the mobile apparatus which is the acquaintance and the mobile apparatus which has the number of meeting greater than the threshold value.

10. The mobile apparatus of claim 1, wherein the cooperation planner is configured to alternately select the cooperation case with the cooperating mobile apparatus.

11. The mobile apparatus of claim 1, wherein the cooperation planner is configured to omit the cooperation case having the expected benefit of the mobile apparatus less than zero among the cooperation cases.

12. The mobile apparatus of claim 1, wherein the cooperation planner is configured to determine the expected benefit using a function representing energy demand to operate the context monitoring.

13. The mobile apparatus of claim 1, wherein the cooperation planner is configured to determine the expected benefit using a cooperation policy of the mobile apparatus.

14. The mobile apparatus of claim 13, wherein the cooperation policy is to minimize energy consumption of the mobile apparatus.

15. The mobile apparatus of claim 13, wherein the cooperation policy is to minimize a weighted sum of energy consumption of all devices of a user having the mobile apparatus.

16. The mobile apparatus of claim 13, further comprising:
an application interface, the application interface configured to receive a context monitoring query from an application, transmit the context monitoring query to the cooperation planner, receive a result of the context monitoring query, and transmit the result of the context monitoring query to the application.

17. The mobile apparatus of claim 13, further comprising:
a device manager configured to receive a sensed data from a sensor, transmit the sensed data to the context processor, receive a resource status of the sensor, and transmit a resource availability to the cooperation planner.

18. The mobile apparatus of claim 17, further comprising:
an internal sensor configured to transmit an internal sensed data to the context processor.

19. The mobile apparatus of claim 13, further comprising:
an access controller configured to transmit an access rule to the cooperation planner to selectively disconnect the adjacent mobile apparatus according to the access rule.

20. A mobile apparatus comprising:
a cooperator detector configured to select a cooperating mobile apparatus among adjacent mobile apparatuses;
a cooperation planner configured to determine a cooperation plan for operating cooperative context monitoring with the cooperating mobile apparatus; and
a context processor configured to operate a context monitoring based on the cooperation plan,
wherein the cooperation planner is configured to generate all possible cooperation cases with the cooperating mobile apparatus, determine expected benefits of the cooperation cases, and select at least one of the cooperation cases based on the expected benefits,
wherein the cooperation cases include a time sharing cooperation case generated by the mobile apparatus and the cooperating mobile apparatus is configured to alternately operate the context monitoring by dividing monitoring time, and
wherein when a set of the time sharing cooperation case is CM, the time sharing cooperation case is case_co, a context being able to be provided by the mobile apparatus is S1, a context needed by the mobile apparatus is D1, a context being able to be provided by the cooperating mobile apparatus is S2 and a context needed by the cooperating mobile apparatus is D2, CM=(case_co (ctxco)|ctxco∈(S1∩D1∩S2∩D2)).

21. A method of cooperative context monitoring, the method comprising:
selecting a cooperating mobile apparatus among adjacent mobile apparatuses using a cooperator detector of a first mobile apparatus;

determining a cooperation plan for operating a cooperative context monitoring with the cooperating mobile apparatus using a cooperation planner of the first mobile apparatus; and operating a context monitoring based on the cooperation plan using a context processor of the first mobile apparatus, wherein the determining a cooperation plan includes,
generating all possible cooperation cases with the cooperating mobile apparatus,
determining expected benefits of the cooperation cases, and
selecting at least one of the cooperation cases based on the expected benefits, wherein the cooperation cases include a role sharing cooperation case generated by the first mobile apparatus and the cooperating mobile apparatus configured to independently operate context monitoring and share results of the context monitoring, and wherein when a set of the role sharing cooperation case is EX, the role sharing cooperation case is case ex, a context provided to the cooperating mobile apparatus is ctxout and a context provided from the cooperating mobile apparatus is ctxin, a context being able to be provided by the first mobile apparatus is S1, a context needed by the first mobile apparatus is D1, a context being able to be provided by the cooperating mobile apparatus is S2 and a context needed by the cooperating mobile apparatus is D2, EX={case_ex(ctxout, ctxin) |ctxout∈(S1∩D2), ctxin∈(D1∩S2), ctxout≠ctxin}.

22. The method of claim 21, wherein the selecting a cooperating mobile apparatus comprises detecting the adjacent mobile apparatus which is able to continuously cooperate with.

23. The method of claim 22, wherein the selecting a cooperating mobile apparatus further comprises determining whether the adjacent mobile apparatus is an acquaintance or not.

24. The method of claim 23, wherein the selecting a the cooperating mobile apparatus further comprises determining a number of meeting with the adjacent mobile apparatus is greater than a threshold value when the adjacent mobile apparatus is not the acquaintance.

25. The method of claim 24, wherein the selecting a cooperating mobile apparatus further comprises checking connection status by trying to reconnect to the adjacent mobile apparatus which is the acquaintance and the adjacent mobile apparatus which has the number of meeting greater than the threshold value after a threshold interval.

26. The method of claim 24, wherein the selecting a cooperating mobile apparatus further comprises determining an expected cooperation duration for the adjacent mobile apparatus which is the acquaintance and the adjacent mobile apparatus which has the number of meeting greater than the threshold value.

27. The method of claim 21, wherein the cooperation case is alternately selected by the first mobile apparatus and the cooperating mobile apparatus.

28. The method of claim 21, wherein the cooperation case includes a time sharing cooperation case generated by the first mobile apparatus and the cooperating mobile apparatus alternately operating the context monitoring by dividing monitoring time.

29. The method of claim 21, wherein to determine the expected benefits of the cooperation cases, the cooperation case having the expected benefit of the at least one of the first mobile apparatus and the cooperating mobile apparatus less than zero is omitted among the cooperation cases.

30. The method of claim 21, wherein to determine the expected benefits of the cooperation cases, a function representing energy demand to operate the context monitoring is used.

31. The method of claim 21, wherein to determine the expected benefits of the cooperation cases, a cooperation policy of the first mobile apparatus is used.

32. A cooperative context monitoring system comprising:
a first mobile apparatus including a cooperator detector configured to select a cooperating mobile apparatus among adjacent mobile apparatuses, a cooperation planner configured to determine a cooperation plan for operating cooperative context monitoring with the cooperating mobile apparatus, and a context processor configured to operate a context monitoring based on the cooperation plan;

a second mobile apparatus configured to operate cooperative context monitoring with the first mobile apparatus when being adjacent to the first mobile apparatus; and a sensor configured to provide a sensed data to the first mobile apparatus when being adjacent to the first mobile apparatus, wherein the cooperation planner is configured to generate all possible cooperation cases with the cooperating mobile apparatus, determine expected benefits of the cooperation cases, and select at least one of the cooperation cases based on the expected benefits, wherein the cooperation cases include a role sharing cooperation case generated by the first mobile apparatus and the cooperating mobile apparatus configured to independently operate context monitoring and share results of the context monitoring, and wherein when a set of the role sharing cooperation case is EX, the role sharing cooperation case is case ex, a context provided to the cooperating mobile apparatus is ctxout and a context provided from the cooperating mobile apparatus is ctxin, a context being able to be provided by the first mobile apparatus is S1, a context needed by the first mobile apparatus is D1, a context being able to be provided by the cooperating mobile apparatus is S2 and a context needed by the cooperating mobile apparatus is D2, EX={case_ex(ctxout,ctxin) |ctxout∈(S1∩D2), ctxin∈(D1∩S2), ctxout≠ctxin}.

33. The cooperative context monitoring system of claim 32, wherein the sensor comprises:
a sensor context processor configured to sense a context and generating the sensed data; and
a resource monitor configured to determine a resource status of the sensor and providing the resource status to the first mobile apparatus.

34. The cooperative context monitoring system of claim 32, wherein the sensor is a wearable sensor which is configured to be attached to a body of a user of the first mobile apparatus.

* * * * *